(12) United States Patent
Glass

(10) Patent No.: US 7,301,433 B2
(45) Date of Patent: Nov. 27, 2007

(54) FUSE AND TRUCK CABLE ASSEMBLY FOR A RAIL VEHICLE THIRD RAIL CURRENT COLLECTOR

(75) Inventor: Eric Grove Glass, Taylors, SC (US)

(73) Assignee: Wabtec Holding Corporation, Wilmerding, PA (US)

( * ) Notice: Subject to any disclaimer, the term of this patent is extended or adjusted under 35 U.S.C. 154(b) by 153 days.

(21) Appl. No.: 11/261,080

(22) Filed: Oct. 28, 2005

(65) Prior Publication Data

US 2007/0096861 A1    May 3, 2007

(51) Int. Cl.
*H01H 85/02*   (2006.01)
*A63H 19/30*   (2006.01)

(52) U.S. Cl. .................. 337/191; 191/45 R; 191/29 R; 337/190; 337/186

(58) Field of Classification Search ................ 337/186, 337/190–191, 168, 195; 191/29 R, 45 R–95; 439/250, 94, 110, 167 M; 246/70
See application file for complete search history.

(56) References Cited

U.S. PATENT DOCUMENTS

| | | | |
|---|---|---|---|
| 2,007,893 A * | 7/1935 | Frank et al. ................. 105/155 |
| 2,027,943 A * | 1/1936 | Wells ........................... 191/27 |
| 2,090,156 A * | 8/1937 | Scholz ........................ 219/545 |
| 2,117,552 A * | 5/1938 | Frank et al. ............... 191/45 A |
| 2,658,125 A * | 11/1953 | Whitfield .................... 337/192 |
| 3,089,005 A * | 5/1963 | Dean et al. .................... 191/49 |
| 3,316,362 A * | 4/1967 | Mayo et al. ................... 191/27 |
| 3,740,498 A | 6/1973 | Herbert |
| 4,116,312 A | 9/1978 | Adler et al. |
| 5,673,774 A | 10/1997 | Trapp et al. |
| 5,757,260 A * | 5/1998 | Smith et al. ................. 337/186 |
| 6,209,693 B1 * | 4/2001 | Siciliano et al. .............. 191/18 |
| 6,533,222 B1 * | 3/2003 | Brooks ....................... 246/28 R |

FOREIGN PATENT DOCUMENTS

| DE | 100 54 170 | 5/2002 |
|---|---|---|
| FR | 2 536 348 A | 5/1984 |
| JP | 04-0331401 | 11/1992 |
| JP | 04 331401 A | 11/1992 |

\* cited by examiner

*Primary Examiner*—Anatoly Vortman
*Assistant Examiner*—Bradley H Thomas
(74) *Attorney, Agent, or Firm*—The Webb Law Firm

(57) ABSTRACT

A fuse and truck cable assembly for a rail vehicle third rail current collector comprising a truck cable, a cable-engaging element, a fuse canister, a canister closure, a fuse contact element, and a flexible gland arranged so that the fuse can be replaced in the fuse in the canister by turning the canister free of the canister closure without removing the gland.

8 Claims, 3 Drawing Sheets

FUSE AND TRUCK CABLE ASSEMBLY FOR A RAIL VEHICLE THIRD RAIL CURRENT COLLECTOR

BACKGROUND OF THE INVENTION

1. Field of the Invention

This invention relates to a fuse and truck cable assembly for traveling electric driven rail vehicles, such as rapid transit cars and, more particularly, to a fuse and truck cable assembly extending between the collector shoe riding on the third rail and the truck bus.

2. Description of Related Art

Electric current collectors for electrically driven rail vehicles are well known in the art. Typically, they have a collector shoe in running engagement with an electrical distribution rail. The collector shoe is resiliently mounted to the vehicle by an arm that permits the working engagement with the rail. See, for example, U.S. Pat. No. 3,740,498 entitled "Electric Current Collector" and U.S. Pat. No. 5,673,774 entitled "Auxiliary Vehicle Current Collector." A fused electrical circuit is connected between the shoe and the truck bus. Typically, cables extend between the shoe and a fuse canister and between the fuse canister and the truck bus.

The time for replacement of collector fuses is a point of concern for maintenance workers performing routine maintenance on electric driven rail vehicles. Typically, it is necessary to remove a gland and then the truck cable from the fuse by removal of fasteners in order to replace the fuse.

Any number of arrangements for holding the fuse in the electrical circuit between the shoe and the truck bus are known. See, for example, U.S. Pat. No. 3,740,498, cited above, Japanese Published Application 04-331401 and German Offenlegungsschrift DE 100 54 170 A1.

SUMMARY OF THE INVENTION

It is an object of this invention to enable quick change of a fuse, for example, during morning inspection prior to the rail vehicle leaving the inspection area.

It is a further object of this invention to provide easier maintenance reducing the time to replace a fuse.

It is a still further object of this invention to provide a fuse and truck cable assembly with better truck cable retention to reduce whipping action of the truck cable due to vibration.

It is yet a further object of this invention to provide a fuse and truck cable assembly with better fuse retention in the fuse canister to reduce fuse failure due to mechanical shock.

Briefly, according to this invention, there is provided a fuse and truck cable assembly for a rail vehicle third rail current collector comprising a truck cable, a cable-engaging element, a fuse canister, a canister closure, a fuse contact element, and a flexible gland arranged so that the fuse can be replaced in the canister by turning the canister free of the canister closure without removing the gland.

The cable-engaging element has a sleeve portion crimped onto the truck cable. The fuse canister has a threaded opening through which a fuse may be inserted. The canister closure assembly has a threaded end for engaging the threads at the opening of the canister. The canister closure has a cylindrical socket and a spring seated in the cylindrical socket. The fuse contact element comprises a contact disc configured on a first face to contact a fuse positioned in the canister and on a second face to contact the spring seated in the cylindrical socket of the canister closure. The fuse contact element further has an extension from the second face configured for being secured to the cable-engaging element. The flexible cable gland secured to the truck cable and the canister closure permits a slight relative movement between the cable and the canister closure. The fuse canister is provided with a terminal post for securing a cable for establishing electrical contact with the third rail (electric power rail).

Preferably, the extension from the second face of the fuse contact element and the cable-engaging element are provided with mating threads and the fuse contact element and the cable-engaging element have threaded bores that can be aligned for receipt of a locking bolt.

In a preferred embodiment, the canister closure element has a cylindrical internal bore at one axial end for passing the cable-engaging element and at the other axial end a larger internal bore defining the cylindrical socket for receiving the spring and washers provided at each axial end of the spring. The various elements are sized so that when the fuse contact element is secured to the cable-engaging element, the spring is slightly compressed and when the canister having a fuse therein is turned onto the canister closure assembly, the spring is further compressed ensuring electrical contact.

In a most preferred embodiment, the cable end opposite from the cable-engaging element is provided with a glad hand coupling for quick engagement and disengagement from the truck bus or a cable extending to the truck bus.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
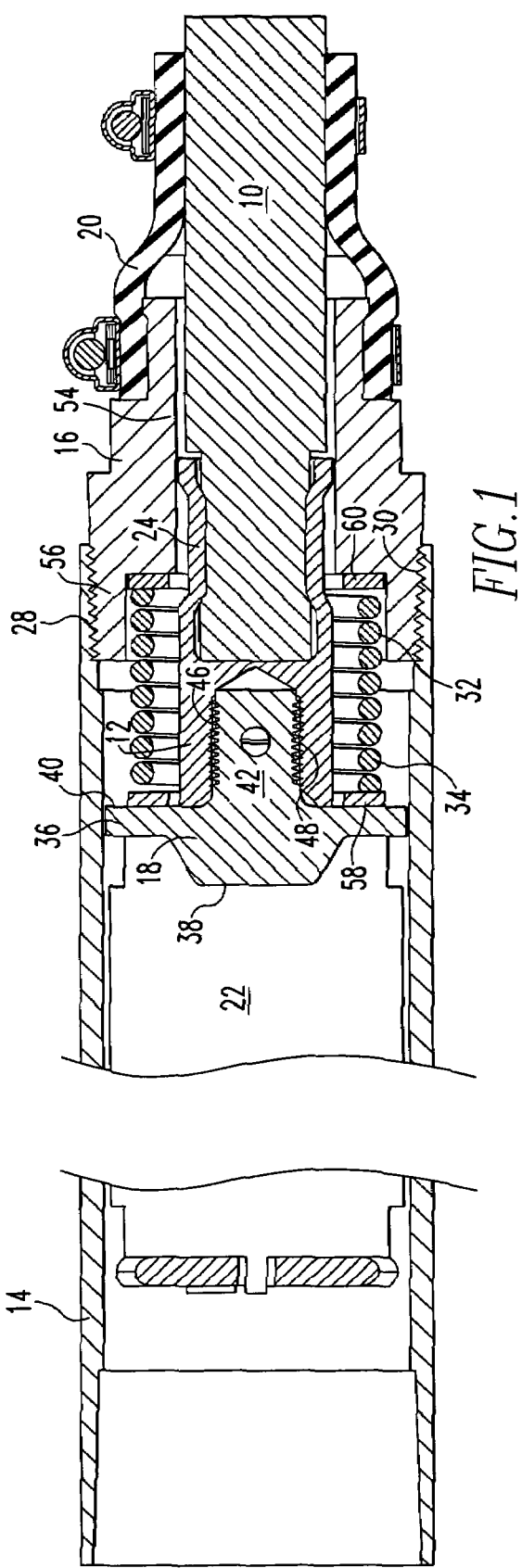
FIG. 1 is a section view through a fuse and truck cable assembly according to this invention.

Referring to FIG. 1, a fuse and truck cable assembly for a rail vehicle third rail current collector comprises a truck cable 10, a cable-engaging element 12, a fuse canister 14, a canister closure assembly 16, a fuse contact element 18, and a flexible gland 20 arranged so that the fuse 22 can be replaced in the fuse canister by turning the canister free of the canister closure without removing the gland.

The cable-engaging element 12 has a sleeve portion 24 crimped onto the truck cable. The fuse canister 14 has an opening 26 with internal or external threads 28 through which a fuse may be inserted. The canister closure assembly 16 has a threaded end 30 for engaging the threads 28 at the opening of the canister. The canister closure assembly has a cylindrical socket 32 and a spring 34 seated in the cylindrical socket. The fuse contact element 18 comprises a contact disc 36 configured on a first face 38 to contact a fuse positioned in the canister and on a second face 40 to contact the spring seated in the cylindrical socket of the canister closure. The fuse contact element 18 further has an extension 42 from the second face 40 configured for being secured to the cable-engaging element. The flexible cable gland 20 is secured to the truck cable 10 and the canister closure assembly 16 permitting a slight relative movement between the cable and the canister closure assembly. The fuse canister is provided with a terminal post (not shown) securing a cable for establishing electrical contract with the third rail (electric power rail).

Preferably, the extension 42 from the second face 40 of the fuse contact element and the cable-engaging element 12 are provided with mating threads 46, 48 and the fuse contact element and the cable-engaging element have threaded bores 50 that can be aligned for receipt of a locking bolt 52.

In a preferred embodiment, the canister closure element has a cylindrical internal bore 54 at one axial end for passing the cable-engaging element and at the other axial end a larger internal bore 56 defining the cylindrical socket for receiving the spring. Washers 58, 60 are provided at each axial end of the spring. The various elements are sized so that when the fuse contact element is secured to the cable-engaging element, the spring is slightly compressed and when the canister having a fuse therein is turned onto the canister closure assembly, the spring is further compressed ensuring electrical contact.

In a most preferred embodiment, the cable end opposite from the cable-engaging element is provided with a glad hand coupling 62 for quick engagement and disengagement from the truck bus.

Figure 2:
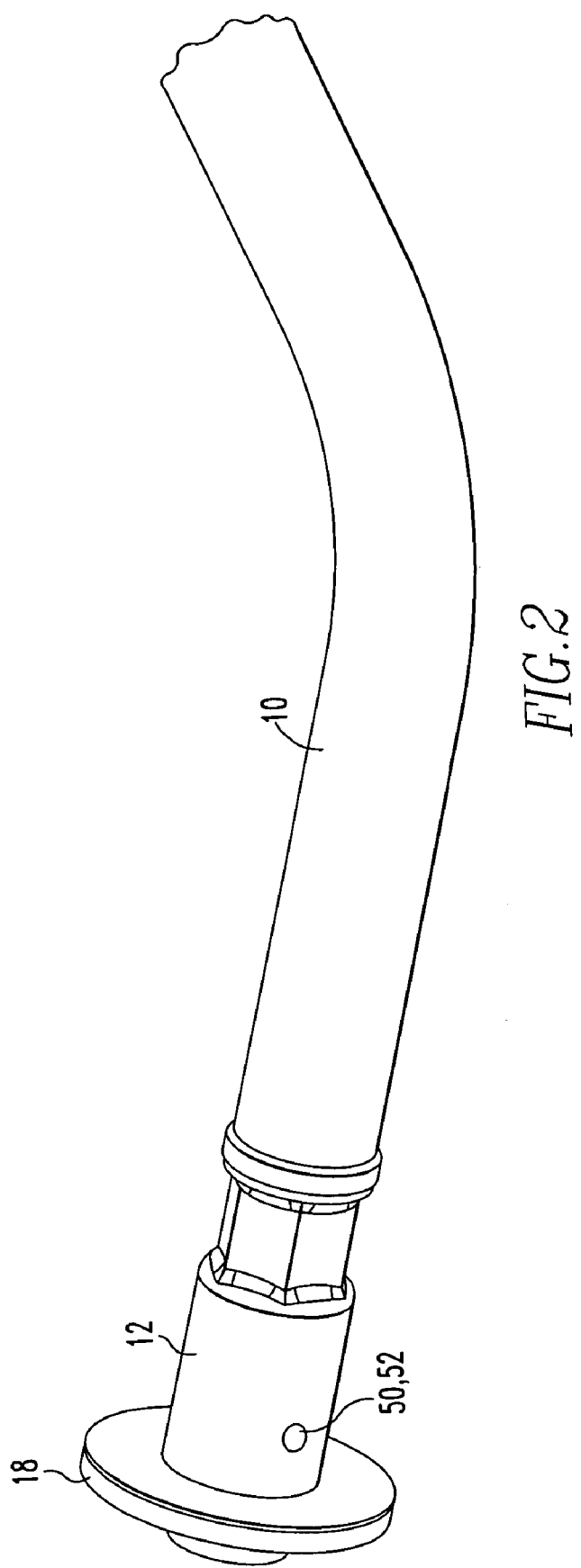
FIG. 2 is a perspective view of a cable and cable-engaging element having a sleeve portion crimped onto the cable.

Referring to FIG. 2, there is shown the cable 10 with the cable-engaging element 12 crimped onto it with a hexagonal cross section crimp. The fuse contact element 18 is shown in place held to the cable-engaging element and secured by the bores and locking bolt 50, 52.

Figure 3:
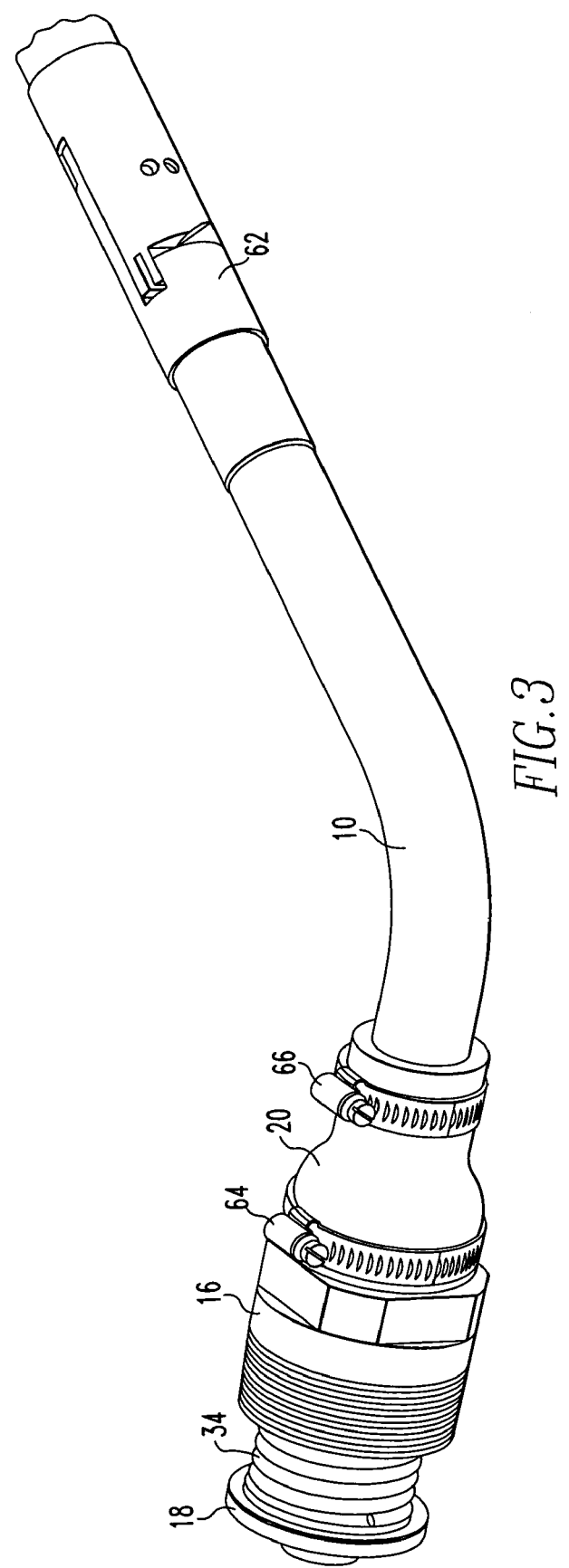
FIG. 3 is a perspective view of a cable and cable-engaging element having a sleeve portion crimped onto the cable also showing the canister closure assembly and the spring held in the canister closure assembly.

Referring to FIG. 3, there is shown the cable 10 with the glad hand coupling 62 at one end. The canister closure assembly 16 is shown surrounding the fuse contact element 18 at the other end with the slightly compressed spring 34 in place in the cylindrical socket 32 and bearing upon the face 40 of the fuse contact element. The flexible gland 20 is shown held in place by two straps 64 and 66 tightened by screw clamps. The threaded ends 30 on the closure element are shown.

Although fuses do not generally require frequent replacement, any decrease in the time to replace the fuse will reduce maintenance costs. The current time required to replace a fuse in a commonly used apparatus requires removal of the gland and then removal of the truck cable by removal of fasteners. The applicant's invention will eliminate the need to remove the fasteners that secure the truck cable.

The applicant's invention provides more rigid fixing of the fuse to the fuse canister. Currently, the fuse canister is cantilevered on the bus bar side and the fuse is held on the truck cable side solely by the gland gripping the truck cable. The loose end of the fuse causes a shock pulse excitation when the current collector endures a shock on the rail structure. Over time in a system with poor rail structure, this shock can weaken internal elements of the fuse and cause reduced performance of the fuse. The fuse and truck cable assembly according to applicant's invention provides a tighter fit to the fuse canister reducing fuse motion within the canister thereby reducing the likelihood of fatigue failure.

The fuse and truck cable assembly according to applicant's invention provides a terminal design with increased surface area contact between the fuse and terminal. This will increase the current carrying capacity and reduce the amount of heat generated at the connection. This will enable the use of lower cost fuses.

Occasionally, collector damage requires replacement of the entire truck cable. A preferred embodiment of the applicant's fuse and truck cable assembly makes use of a short section of truck cable with a glad hand connection. This eliminates the need to replace the entire truck cable.

Having thus described my invention with the detail and particularity required by the Patent Laws, what is desired protected by Letters Patent is set forth in the following claims.

The invention claimed is:

1. A fuse and truck cable assembly for a rail vehicle third rail current collector comprising:
   a truck cable;
   a cable-engaging element having a sleeve portion crimped onto the truck cable;
   a fuse canister having an open end through which a fuse may be inserted, said open end being threaded;
   a canister closure assembly having a threaded end for engaging the threads at the opening of the fuse canister, said canister closure assembly having a cylindrical socket and a spring seated in the cylindrical socket;
   a fuse contact element comprising a contact disc configured on a first face to contact a fuse positioned in the fuse canister and on a second face to contact the spring seated in the cylindrical socket of the canister closure assembly such that the spring biases the fuse contact element away from the canister closure assembly, said fuse contact element further having an extension from the second face configured for being secured to the cable-engaging element; and
   a flexible cable gland secured to the truck cable and the canister closure assembly permitting a slight relative movement therebetween,
   whereby a fuse can be replaced in the fuse canister by turning the canister closure assembly free of the fuse canister without removing the gland.

2. The fuse and truck cable assembly according to claim 1, wherein the extension from the second face of the fuse contact element and the cable-engaging element are provided with mating threads.

3. The fuse and truck cable assembly according to claim 2, wherein the extension from the second face of the fuse contact element and the cable-engaging element have threaded bores that can be aligned for receipt of a bolt.

4. The fuse and truck cable assembly according to claim 1, wherein the canister closure assembly has a cylindrical internal bore at one axial end for passing the cable-engaging element and at the other axial end a larger internal bore defining the cylindrical socket for receiving the spring.

5. The fuse and truck cable assembly according to claim 1, wherein the fuse canister, canister closure assembly, fuse contact element and cable-engaging element are sized so that when the fuse contact element is secured to the cable-engaging element the spring is slightly compressed and when the canister having a fuse therein is turned onto the canister closure assembly the spring is further compressed ensuring electrical contact.

6. The fuse and truck cable assembly according to claim 1, wherein the fuse canister is provided with means for establishing electrical contact with the third rail.

7. The fuse and truck cable assembly according to claim 1, wherein the canister closure assembly is provided with washers at each axial end of the spring.

8. The fuse and truck cable assembly according to claim 1, wherein the truck cable end opposite from the cable-engaging element is provided with a glad hand coupling for quick engagement and disengagement.

* * * * *